United States Patent [19]

Farnham

[11] Patent Number: 5,103,687

[45] Date of Patent: Apr. 14, 1992

[54] SELF-ADJUSTING TRUNNION ASSEMBLY

[75] Inventor: Robert E. Farnham, Naperville, Ill.

[73] Assignee: Asphalt Product Technologies, Geneva, Ill.

[21] Appl. No.: 592,704

[22] Filed: Oct. 3, 1990

[51] Int. Cl.⁵ .............................................. F16H 15/00
[52] U.S. Cl. ......................................... 74/206; 366/63
[58] Field of Search ..................... 74/206; 366/62, 63

[56] References Cited

U.S. PATENT DOCUMENTS

| | | | |
|---|---|---|---|
| 1,642,482 | 9/1927 | Bernhard | 74/206 X |
| 2,570,082 | 10/1951 | Traylor, Jr. | 74/206 X |
| 3,033,057 | 5/1962 | Gray | 74/206 |
| 3,371,547 | 3/1968 | Eckert et al. | 74/206 |
| 4,624,576 | 11/1986 | Dillman | 366/63 |
| 4,892,411 | 1/1990 | Elliott et al. | 366/25 |

Primary Examiner—Leslie A. Braun
Assistant Examiner—Ryan W. Massey
Attorney, Agent, or Firm—Wallenstein, Wagner & Hattis, Ltd.

[57] ABSTRACT

A trunnion assembly (10) for adjusting a rotating cylindrical container (16) having a circumferential tire (7) is disclosed. The assembly (10) includes a rotating roller (11) supported between a pair of brackets with bearings (12) that are attached to a first base plate (13A) pivotally supported on a second fixed base plate (13B). An elongated arm (14) is secured to the first base plate (13A) at one end and secured to a guide base plate (15) at the other end. A pair of spaced guide rollers (16) are mounted on the guide base plate (15). The circumferential tire (7) is positioned between the guide rollers (16) and the rollers (16) are positioned within a barrier assembly (20).

15 Claims, 2 Drawing Sheets

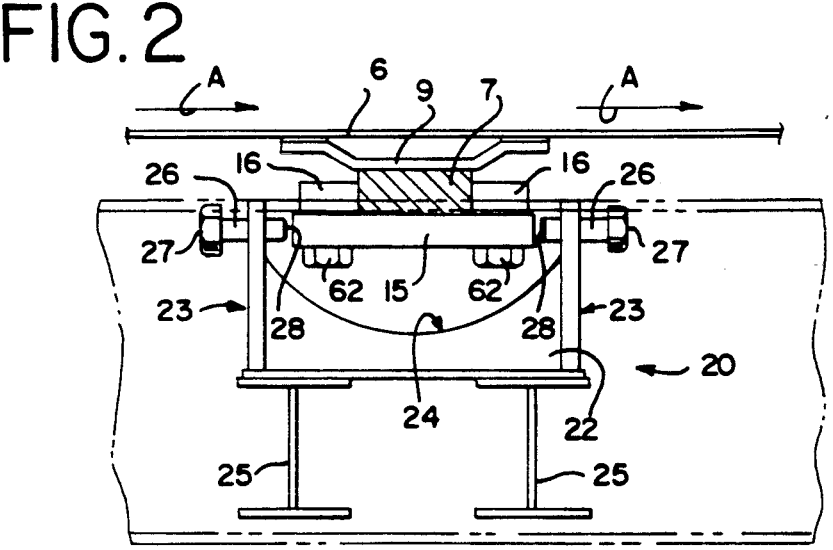
FIG. 2
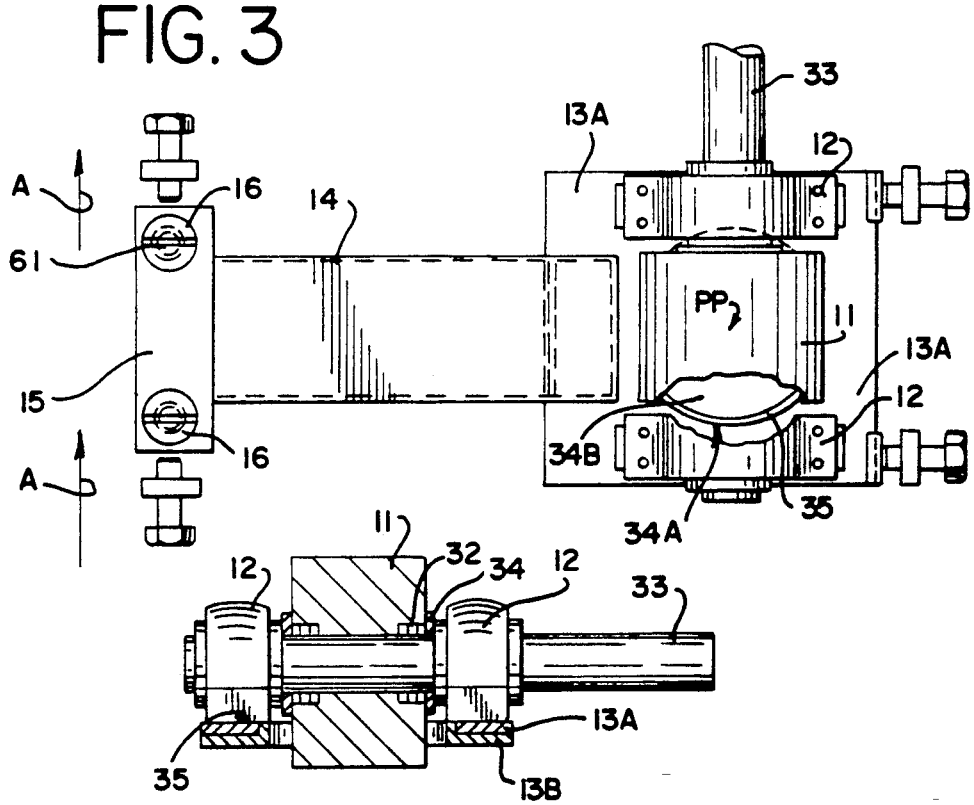
FIG. 3
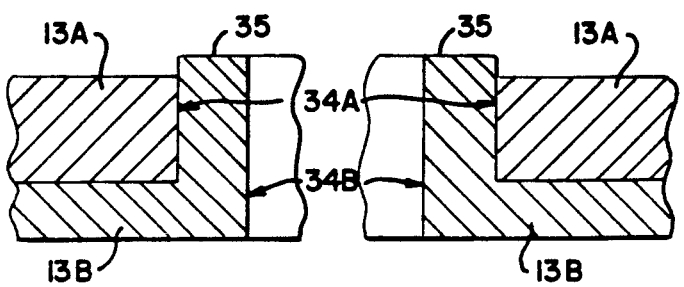
FIG. 4
FIG. 5

SELF-ADJUSTING TRUNNION ASSEMBLY

DESCRIPTION

1. Technical Field

The present invention relates to drive mechanisms for asphalt production equipment and, more particularly, to a self-adjusting trunnion assembly for use in conjunction with an inclined rotating drum.

2. Background Prior Art

There are numerous systems used today in asphalt production. A technique used, called a Drum Mix type system, produces asphalt products of either a mixture of recycled asphalt and virgin materials or of virgin materials only. At the beginning of the system, a large drum is used to dry the asphalt aggregate. The aggregate is placed into one end of the drum and a large burner is located at the other end of the drum. The drum is mounted so as to be tilted downwardly towards the burner so that when the drum rotates, its internal flights lift, drop and mix the contents while they move in a direction towards the burner. The dried contents are discharged into a mixing drum that is either part of the drying drum or a separate drum. In this mixing drum, recycled asphalt product, liquid asphalt and fines are introduced, added to the aggregate, tossed and mixed. One asphalt producing assembly is disclosed in U.S. Pat. No. 4,892,411. Another system, which is highly successful, is disclosed in a co-pending application that is assigned to the Assignee-Owner of the present invention, Serial No. 07/592,704.

In the past, these drums were driven with a gear set or attached chain and rode on multiple trunnions.

Typically, today the drums in these systems are driven by trunnions, motor driven wheels that both support and rotate the drums. The drums have two or more annular or circumferential tracks, commonly referred to as tires or support rings, that act as annular rails for each trunnion to engage. Commonly, a drum rests on four such trunnions, two trunnions per track. And, the trunnions are supported on a support structure.

It has been found that cylindrical drums that are supported on four wheels or trunnions, when rotated, tend to move about or randomly wander. When the drum is inclined, the random wandering is downward due to gravity. It has further been found that the downward thrust of the drum will increase as the incline of the rotating cylindrical drum increases.

Since the longitudinal forces on a horizontal rotating drum are minimal, flanged trunnions are often used to prevent the undesirable horizontal motion. These flanges trunnions are, at times, used in conjunction with systems that have inclined drums. However, this oftentimes result in severe wear on the flange.

Also, to counteract the drum's tendency to move downwardly because of its incline and motion, the trunnions are not placed parallel to the drum, i.e., the trunnion's longitudinal axes are not exactly parallel to the longitudinal axis of the drum. Rather, the trunnions are skewed very slightly with respect to the drum and tires. However, this skewing does not prevent the eventual movement up or down, or the creep, by the rotating drum due to changes in conditions. Thus, thrust rollers are placed next to and substantially perpendicular to the circumferential tires to prevent the drum from creeping downwardly, or upwardly if there is too much skew. However, such thrust rollers are often not heavy enough to take the full thrust of the drum, especially if the trunnions are misadjusted. Further, the application of a great amount of force on the thrust rollers can result in unnecessary wear on other components.

Also, often times the trunnions are adjusted improperly which can interrupt operations and, possibly, damage equipment. Moreover, even if the trunnions are adjusted properly and skewed correctly, the amount of creep of the drum can vary depending on the physical, dynamically changing characteristics of the drum's load. As a result, the trunnions are readjusted frequently and the performance and equipment can be negatively affected.

There is, therefore, a significant need for a mechanism that can keep the drum from creeping downwardly or upwardly and is capable of handling varying loads and directional surges by the drum.

SUMMARY OF THE INVENTION

The assembly of the present invention permits one to use a trunnion to support the drum and prevent the drum from moving downwardly as it rotates. The trunnion also pivots to drive the drum upwardly. Specifically, the trunnion of the present invention is self-adjusting in that if the drum moves longitudinally beyond a certain equilibrium position, the trunnion will readjust itself and redirect the drum to move in the other, opposite direction back to the equilibrium position. The self-adjusting trunnion of the present invention can also accommodate longitudinal movements of different amounts and speeds. Thus, as the contents of the drum change and the creeping of the drum fluctuates, the trunnion will still perform its re-adjusting function.

The trunnion assembly of the present invention is designed for adjusting a rotating cylindrical container, such as a dryer drum used in asphalt production, from a longitudinally improper position to a longitudinally proper position The self-adjusting trunnion includes a freely rotatable roller for engaging the circumferential track or tire of the rotating drum. This roller may be driven by a motor. The roller is supported by bearings and between a pair of supports or brackets that are fixedly secured to a first base plate.

There is a circular aperture in the first plate for permitting the roller to partially extend therethrough. A second, lower base plate, with a circular aperture concentric with the one in the first base plate and smaller in cross-sectional area, abuts the first base plate. The second base plate also includes a single or multiple projection that extends upwardly therefrom and through the larger aperture in the first base plate so as to permit the first base plate to pivot on top of the second base plate, but not slip off or sideways on the second base plate.

A pair of spaced guide rollers are connected to a guide roller base plate which in turn is connected by an elongated arm to the first base plate. Each of the guide rollers is positioned on a different side of the circumferential tire so that the tire is disposed therebetween. The guide rollers and guide roller base plate are movable in a substantially parallel direction to the longitudinal axis of the drum. Thus, as the drum, and consequently the tire, move longitudinally up or down, the guide rollers and guide roller base plate move longitudinally up or down with them.

Consequently, when the drum and tire creep upwardly or downwardly in the longitudinal direction, the guide rollers follow, pivot the first base plate connected thereto by the elongated arm, which in turn pivots the roller. This pivoting or skewing of the roller causes it to drive the drum in the opposite direction of the original creep until the drum is moved to the proper position.

Barriers are positioned on each side of the guide rollers opposite the side of the rollers positioned adjacent the circumferential tire in order to limit the travel of the guide rollers in the longitudinal direction when the tire moves with the drum longitudinally.

The barrier assembly includes a pair of adjusting screws mounted to a stationary frame structure. The guide rollers and guide roller base plate are disposed within the frame and between the screws.

Other advantages and aspects of the present invention will become apparent upon reading the following description of the drawings and detailed description of the invention.

BRIEF DESCRIPTION OF DRAWINGS

FIG. 2 is a side sectional view of a portion of the self-adjusting trunnion assembly made in accordance with the teachings of the present invention;

FIG. 3 is a top plan view of the self-adjusting trunnion assembly;

FIG. 4 is a side elevation view of another portion of the self-adjusting trunnion assembly; and, FIG. 5 is a partial side sectional view of the upper and lower base plates.

DETAILED DESCRIPTION

Figure 1:
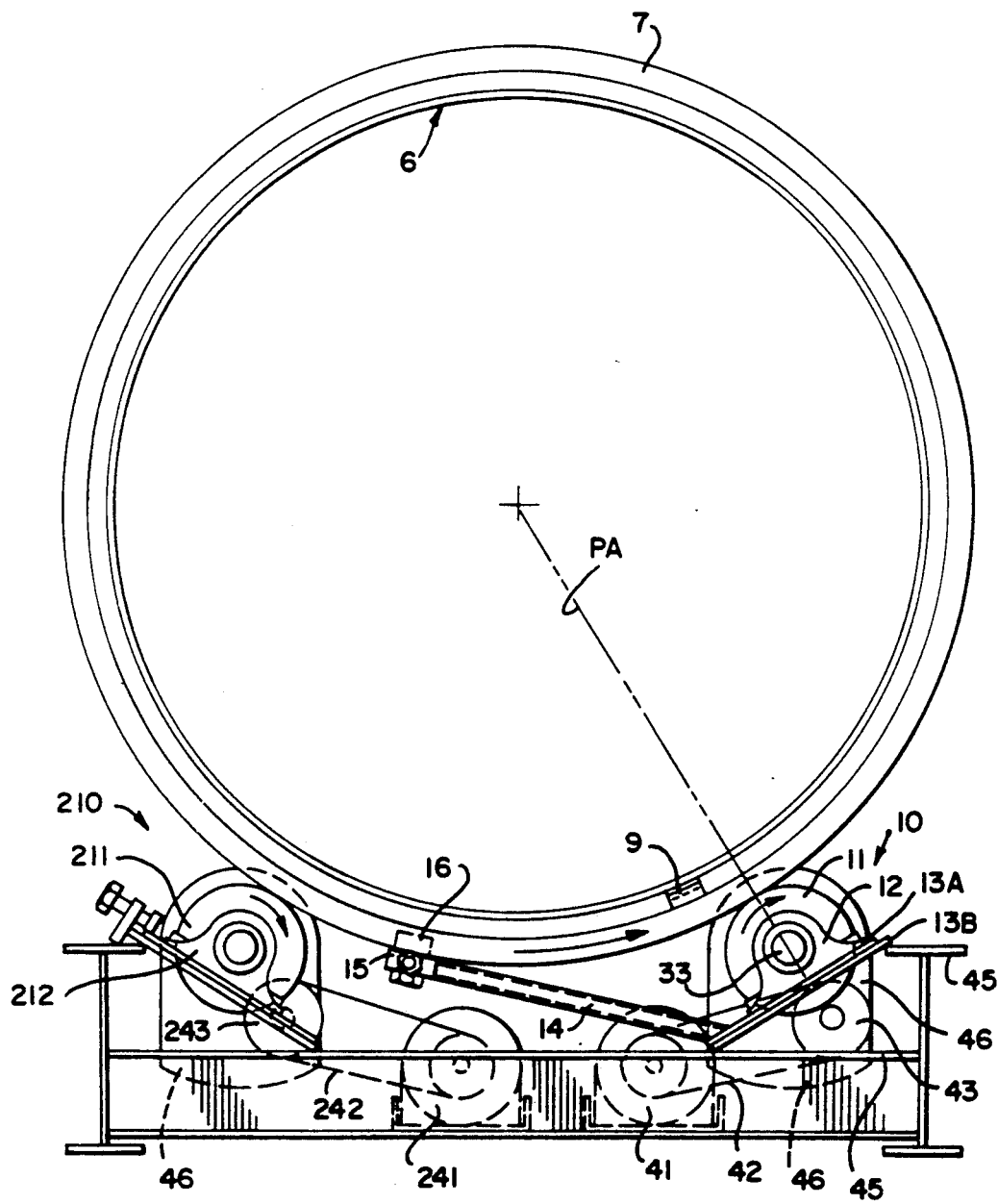
FIG. 1 is an end elevation view of the drum, a standard trunnion and a self-adjusting trunnion assembly made in accordance with the teachings the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

The self-adjusting trunnion assembly of the present invention, designated by the reference numeral 10, is generally shown in FIG. 1. Preferably, the cylindrical drum 6 is supported on four trunnions Only one such trunnion needs to be self-adjusting. The drum 6 preferably has two parallel circumferential tires 7 attached to it. Each tire 7 is secured to the drum by a plurality of tire supports 9 that are fastened to both the tire 7 and the exterior surface of the drum 6.

The trunnion 10 has a roller assembly that includes a roller 11 that rotates and frictionally engages the outermost surface of the circumferential tire 7 causing the cylindrical drum 6 attached to the tire 7 to also rotate. The direction of rotation of the drum in the illustration is shown by the arrows in FIG. 1. A motor 41 drives and rotates a belt or chain 42 around it and a V-belt pulley 43 mounted on the input shaft of a gear box 46. This gear box 46 is mounted onto an extension of the shaft 33 through the center of the trunnion 10. Thus, a motor 41 can drive the trunnion 10 of the present invention. However, significantly, the trunnion 10 of the present invention does not have to be driven by a motor. It can still adjust the rotating drum 6 if it is one of the trunnions that is supporting the drum 6.

A standard trunnion 210 is also shown in FIG. 1. Similar components are designated similarly to the self-adjusting trunnion 10, but in the 200-series.

The roller 11 is supported by and between pair of brackets or supports 12. In the figures, a pillow block bearing type of support that permits rotation therein is shown. A shaft 33 that rotates the roller 11 runs through both the roller 11 and the brackets 12. A lock assembly 32 and washer 34 ensure that the roller 11 is secure to the shaft 33 and maintains a spaced position from each bracket 12.

Each support 12 is securely fixed to a base plate 13A. An aperture 34A that is circular is provided in the base plate 13A in order to prevent the roller 11 from contacting the plate 13A. As shown in detail in FIGS. 3 and 4, a portion of the roller 11 extends through this aperture 34A to position the center of the trunnion 10 (the longitudinal axis of the shaft 33) as close to the lower base plate 13B as possible.

An elongated arm 14 is rigidly connected at one end to the base plate 13A. And, as shown generally in FIG. 1, the angle formed by the intersection of the elongated arm 14 and the base plate 13A is greater than 90 degrees. In this FIG., this intersection angle is shown to be approximately 135 degrees. However, it is recognized that this angle can vary depending on the positioning of the trunnion 10 and the length of the elongated arm 14. It is desirous to have this intersection angle be as large as possible. Realistically though, as the intersection angle approaches 180°, the length of the arm approaches zero.

In some asphalt production assembly designs, the trunnions are mounted horizontal to the drum and off-center so that the elongated arm intersects the base plate at 180° regardless of its length.

The other end of the elongated arm 14 is rigidly connected to a guide base plate 15. Two guide rollers 16 are mounted on the guide base plate 15. These guide rollers are spaced apart so as to permit the circumferential tire 7 to rotate in the space therebetween. The guide rollers 16 are also preferably oriented so as to contact the side surfaces of the circumferential tire 7.

Specifically, as shown in FIG. 2, the guide rollers 16 straddle the circumferential tire 7 and each typically contacts a tire side surface. Each guide roller 16 is mounted on the guide base plate by a bolt 61 (FIG. 3) and a nut 62 (FIG. 2). A bearing (not shown) internal to the guide roller permits the guide roller to rotate.

Thus, when the rotating drum 6, which is downwardly inclined, moves downwardly in the longitudinal direction (see arrow A in FIGS. 2 and 3), the circumferential tire 7 also moves longitudinally downwardly. This action causes the guide rollers 16, straddling the tire 7, to follow the tire downwardly in the longitudinal direction. This downward movement by the guide rollers 16 causes a pivoting of the roller 11.

For example, as shown in FIG. 1, the assembly 10 pivots about a pivot axis PA. The pivot axis PA appears as a pivot point PP in FIG. 3. This pivoting action is accomplished by having a second, lower base plate 13B fixedly secured, such as by welding to a main frame structure 45. This frame 45 and the lower base plate 13B preferably do not move. The lower frame plate 13B, like the first, upper frame plate 13A, has a circular aperture 34B therein. The cross-sectional area of this second aperture 34B is smaller than the aperture 34A in the upper base plate 13A. And, the two apertures 34A,34B are substantially concentric A portion of the roller 11 also extends through the aperture 34B in the second base plate 13B.

One or more upwardly extending projections 35 extend from the upper surface of the second, lower base plate 13B through the aperture in the first, upper base plate 13A. This is shown in detail in FIG. 5. The weight of the cylinder 6 on the roller 11 and the upper base plate 13A keep the upper base plate pressed against the lower base plate 13B. Accordingly, the bottom surface of the upper base plate 13A abuts and maintains contact with the top surface of the lower base plate 13B. The projections 35 act as a barrier to prevent the upper base plate 13A from slipping on the lower base plate 13B, while permitting rotation of the upper plate 13A relative to the lower plate 13B.

The projections 35 may take the form of a circular guard rail, or of a plurality of protuberances. In short, the projections maintain the apertures 34A,34B concentric to one another and prevent the plates 13A,13B from slipping apart or slipping sideways Therefore, the travel longitudinally downwardly by the rotating drum 6, the circumferential tire 7 and the guide rollers 16 straddling the tire 7 cause the upper base plate 13A to rotate and pivot relative to and on the lower, stationary base plate 13B. Consequently, the roller 11 secured to the upper plate 13A by the brackets 12 pivots relative to the cylindrical drum 6 and the lower plate 13B. The roller 11 maintains its contact with the circumferential tire 7, albeit from a slightly different angle.

The pivoting movement longitudinally downwardly by the guide roller 16 stops when it contacts a barrier. This barrier is to limit the longitudinal movement of the guide roller 16 and of the drum 6. This is because, in some cases, if the drum 6 were to be allowed to move longitudinally beyond a certain point, the drum would be damaged. Also, it has been found that in situations when the four trunnions have been improperly skewed, the barrier can prevent damage to the drum. In such situations, although the self-adjusting trunnion may not completely compensate the drum's movement, the trunnion will act as a thrust roller when contacting a barrier.

In particular, as shown in detail in FIG. 2, a barrier assembly 20 partially envelopes the guide rollers 16 and guide roller plate 15. This barrier assembly 20 is separate from the guide rollers 16, is stationary and does not move. It comprises a frame 22 that is fixedly secured to a frame support 25. The frame 22 has two side portions 23 and an arcuate portion 24. The arcuate portion 24 not only permits the guide base plate 15 with the attached guide rollers 16 to pivot and move within the frame 22 without being contacted by any portion of the frame 22, but also acts as a gusset to stiffen the side portions 23.

On the other hand an adjusting screw 26 is threaded into the upper portion of each frame side portion 23 so that the head 27 of the screw 26 remains outside the frame 22. The end 28 of the screw 26 projects inwardly into the frame 22. Thus, it is the ends 28 of the opposed screws 26 that contact the guide roller plate 15 and act as a barrier to any further longitudinal motion of the guide rollers 16 and guide roller plate 15. This action also prevents the further pivoting of the upper base plate 13A and the roller 11 on the lower base plate 13B.

Thus, in the example above, when the drum 6 is moving downwardly in the longitudinal direction, the guide rollers 16 straddling the circumferential tire 7 also move longitudinally downwardly relative to the drum. The attached roller 11 also pivots relative to the cylindrical drum 6. While the roller 11 is pivoting in response to the downward motion of the drum 6, it is contacting the tire 7 and countering this drum motion. In short, the pivoted roller 11 tries to drive the rotating drum 6 upwardly in the longitudinal direction. This driving force will continue even in extreme conditions when the guide roller base plate 15 contacts the end 28 of one of the adjusting screws 26. In such a condition, both the pivoting of the roller 11 and the longitudinal movement of the guide rollers 16 stop. Eventually, the roller 11 succeeds in driving the drum 6 upwardly in the longitudinal direction to a point of equilibrium and the desired position.

Conversely, if the drum 6 moves upwardly in the drum's longitudinal direction, the tire 7 will also move upwardly and take the straddling guide rollers 16 with it. The guide rollers 16 will continue to move longitudinally upwardly relative to the drum 6 in a direction opposite to the one described above with respect to the downwardly moving drum 6. As the guide rollers 16 move with the tire 7, the roller 11 contacting the tire 7 pivots and drives the drum 7 longitudinally downward to a point of equilibrium and the desired position.

As above, in very extreme situations, the guide base plate 15 will contact the end 28 of one of the adjusting screws 26. This is the screw 26 opposing the one contacted when the drum was moving downwardly. As a result of this contact between the plate 15 and the screw 26, the roller 11 and upper base plate 13B stop pivoting. As before, during this pivoting and contacting of the opposed screw 26, the roller 11 continues to and succeeds in driving the rotating drum 6 downwardly in the longitudinal direction to a point of equilibrium.

Thus, the trunnion 10 adjusts to longitudinal movements by the rotating cylindrical drum 6. A longitudinally proper position of the drum 6 or equilibrium point would be when the roller 11 is not pivoting but is stationary and generally midway within the bracket side portions 23. If the drum 6 moves downwardly in the longitudinal direction, the self-adjusting trunnion 10 will drive it upwardly in the longitudinal direction. And, if the drum 6 moves longitudinally upwardly, the self-adjusting trunnion 10 will drive it longitudinally downwardly. At all times the roller 11 is in contacting relation with the circumferential tire 7.

The adjusting screws 26 can be adjusted to limit the longitudinal motion of the guide rollers 16 and guide base plate 15.

The above-described trunnion response is extremely fast. In practice, the response, i.e., pivoting of the roller 11 and opposite driving force against the drum's movement, is almost instantaneous and undetectable by the naked eye.

The entire assembly 10 is supported on a main frame 45 as shown in FIG. 1.

While the specific embodiments have been illustrated and described, numerous modifications come to mind without significantly departing from the spirit of the invention and the scope of protection is only limited by the scope of the accompanying claims.

I claim:

1. A trunnion assembly for automatically adjusting a rotating cylindrical container while the container is rotating from a longitudinally improper position to a longitudinally proper position, the rotating container having a circumferential tire secured thereto, comprising:

a freely rotatable roller for engaging and driving the circumferential tire of the rotating container;

means cooperating with the tire for detecting the improper position of the rotating container, said detecting means moving longitudinally with the rotating tire in a direction substantially parallel to the longitudinal axis of the container;

means coupled to said detecting means for pivoting said roller to drive the rotating container longitudinally to the proper position.

2. A trunnion assembly as defined in claim 1, wherein said detection means is a pair of spaced guide rollers that are connected to a roller assembly, the circumferential tire being disposed between said guide rollers.

3. A trunnion assembly for adjusting a rotating cylindrical container from a longitudinally improper position to a longitudinally proper position, the rotating container having a circumferential tire secured thereto, comprising:

a freely rotatable roller for engaging the circumferential tire of the rotating container;

a pair of spaced guide roller for detecting the improper position of the rotating container movable in a direction substantially parallel to the longitudinal axis of the cylindrical container that are connected to a roller assembly, the circumferential tire being disposed between said guide rollers, said roller assembly including a first base plate having a pair of supports fixedly secured thereto, said rotating roller being supported between said supports; and, means coupled to said detecting means for pivoting said roller to drive the rotating container to the proper position.

4. A trunnion assembly as defined in claim 3, wherein said means for pivoting said roller is an aperture in said first base plate for permitting said roller to partially extend therethrough and a second, lower base plate abutting said first base plate having an aperture substantially concentric with and being smaller in cross-sectional area than said aperture in said first base plate, said second base plate having a projection extending upwardly therefrom through said aperture in said first base plate so as to permit said first base plate to rotate on said second base plate.

5. A trunnion assembly as defined in claim 4, wherein said guide rollers are connected to a guide roller plate, said guide roller plate being connected to said roller assembly by an elongated arm.

6. A trunnion assembly as defined in claim 5, wherein a barrier is positioned on the sides of said guide rollers opposite the sides of said guide rollers that are positioned next to said circumferential tire.

7. A trunnion assembly as defined in claim 6, wherein said barrier includes a pair of adjusting screws mounted to a stationary frame structure, said guide rollers being disposed between said screws.

8. A trunnion assembly for automatically adjusting a rotating cylindrical container while the container is rotating from a longitudinally improper position to a longitudinally proper position, the rotating container having a circumferential tire secured thereto, comprising:

a roller assembly including a rotating roller for engaging and driving the circumferential tire and a support structure permitting said roller to rotate therein;

means for pivoting said roller assembly;

guide means cooperating with the tire attached to said roller assembly for detecting that the container has moved to said improper position and for causing said roller assembly to pivot to drive and move the rotating container to said longitudinally proper position, said guide means moving longitudinally with the rotating tire and in a direction substantially parallel to the longitudinal axis of the container.

9. A trunnion assembly as defined in claim 8, wherein said roller is supported between a pair of brackets with bearings, each said bracket being attached to a substantially perpendicular first base plate.

10. A trunnion assembly as defined in claim 9, wherein said guide means includes a pair of spaced guide rollers freely rotatable on a guide base plate that is movable in a substantially parallel direction to the longitudinal axis of the cylindrical container, the circumferential tire being disposed between said guide rollers, said guide base plate being connected to a first base plate by an elongated arm.

11. A trunnion assembly for adjusting a rotating cylindrical container from a longitudinally improper position to a longitudinally proper position, the rotating container having a circumferential tire secured thereto, comprising:

a roller assembly including a rotating roller for engaging the circumferential tire and directing the rotating container and a support structure permitting said roller to rotate therein, said roller engaging the circumferential tire, said roller being supported between a pair of brackets with bearings, each said bracket being attached to a substantially perpendicular first base plate;

guide means attached to said roller assembly for detecting that the container has moved to said improper position and for causing said roller assembly to pivot to move the container to said proper position, said guide means including a pair of spaced guide rollers freely rotatable on a guide base plate that is movable in a substantially parallel direction to the longitudinal axis of the cylindrical container, the circumferential tire being disposed between said guide rollers, said guide base plate being connected to a first base plate by an elongated arm; and, means for pivoting said roller assembly having a first base plate including an aperture for permitting said roller to partially extend therethrough, said first base plate abutting a second, lower base plate having an aperture concentric with and having a smaller cross-sectional area than said aperture in said first base plate, said second base plate further having a projecting extending upwardly therefrom through said aperture in said first base plate so as to permit said first base plate to rotate on said second base plate without slipping.

12. A trunnion assembly as defined in claim 11, wherein said guide rollers are disposed between a pair of barriers so as to limit said movement of said guide rollers in the longitudinal direction.

13. A trunnion assembly as defined in claim 12, wherein said elongated arm intersects said first base plate at an angle greater than 90 degrees.

14. A trunnion assembly as defined in claim 13, wherein said barrier includes a pair of adjusting screws mounted to a stationary frame structure, said guide rollers and said guide roller base plate being disposed between said screws.

15. A self-adjusting trunnion assembly for supporting and rotating a cylindrical container having a circumferential tire thereon comprising:
- a rotating roller engaging and driving the tire and container in a first direction;
- means for rotating said roller;
- means for supporting said roller so as to permit said roller to freely rotate therein;
- guidance means coupled to said supporting means for cooperating with the tire for detecting when the container has moved in the longitudinal direction beyond a threshold amount and for causing the roller to engage and drive the tire and container in the opposite direction, said guidance means moving longitudinally with the rotating tire in a direction substantially parallel to the longitudinal axis of the container.

* * * * *